No. 789,238.

Patented May 9, 1905.

UNITED STATES PATENT OFFICE.

WLADYSLAW SKOWRONSKI, OF CHICAGO, ILLINOIS.

PROCESS OF CURING MEAT.

SPECIFICATION forming part of Letters Patent No. 789,238, dated May 9, 1905.

Application filed December 5, 1904. Serial No. 235,625.

*To all whom it may concern:*

Be it known that I, WLADYSLAW SKOWRONSKI, a subject of the Emperor of Austria-Hungary, residing at Chicago, in the county of Cook and State of Illinois, have invented certain new and useful Improvements in Processes of Curing Meat, of which the following is a full and complete description, sufficient to enable those skilled in the art to which it pertains to understand, make, and use the same.

The object of this invention is to obtain boneless smoked pork-loin, which may be preserved for an indefinite time without cooking and then, preferably without cooking, eaten.

The process of curing pork-loin invented by me consists in taking a pork-loin of any desired size and length, removing the bones therefrom, then placing the same in a receptacle covered with a preserving mixture hereinafter described and permitting it to remain in such preserving mixture for a period of not less than fourteen days, then removing such pork-loin from such preserving mixture and forcing the same into a casing prepared in the usual manner from the intestines of an ox, cow, or other animal, and in the submitting the casing with the pork-loin therein to the action of smoke—say in the ordinary way of smoking hams—for a period of about three days.

The preserving mixture used by me consists of the following articles in substantially the quantities, bulk measurement, as follows: To cure, say, forty pounds of pork-loin, take two parts of saltpeter, (say four ounces,) sixteen parts of common salt, one and one-third parts of coriander, one part of whole pepper, which may be black and white mixed, or either alone, one part of allspice, one and one-half parts of cloves, whole, about forty bay-leaves, and about forty sprigs of sweet marjoram. The several ingredients named are mixed together and applied to the outside of the loin of pork after the same has been boned. The loin of pork is then placed in a suitable receptacle and a weight placed thereon to hold the same down in the brine or liquid which will collect during the fourteen days in which such loin of pork is to remain in such preserving mixture. After the loin of pork has been cured in such mixture in the manner described and taken therefrom and forced into the casing a string may be tied around the same (before it is submitted to smoking) to prevent any breaking open of the casing, although, of course, the placing of the string around the casing forms no essential part of the process.

Loin of pork cured by the herein-described process will present when cut into the color and appearance of fresh meat, and I have found that the same will retain such appearance, be palatable, and not injurious for eating for many months.

In practice I have retained meat cured by me by this process for more than six months and found the same in a perfectly wholesome and palatable condition as a food product at the end of such time.

Having thus described my invention, what I claim as new, and desire to secure by Letters Patent, is—

The process of curing pork-loin which consists in first removing the bones therefrom, then applying thereto a preserving mixture consisting of a two parts of saltpeter, sixteen parts of common salt, one and one-third parts of coriander, one part of whole pepper, one part of allspice, one and one-half parts of cloves, whole, about forty bay-leaves, and about forty sprigs of sweet marjoram, and in maintaining such meat in such mixture for about fourteen days, then forcing the meat into a casing and in submitting such casing with its contents to smoke for a period of about three days; substantially as described.

WLADYSLAW SKOWRONSKI.

In presence of—
CHARLES TURNER BROWN,
JOSEF MOELLER.